United States Patent
Iesaka et al.

(10) Patent No.: US 6,600,871 B1
(45) Date of Patent: Jul. 29, 2003

(54) DIGITAL VIDEO CASSETTE RECORDER

(75) Inventors: Kazuyuki Iesaka, Tokyo (JP); Yasutaka Kotani, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/307,055

(22) Filed: May 7, 1999

(30) Foreign Application Priority Data

May 11, 1998 (JP) .......................................... 10-127482

(51) Int. Cl.[7] .................................................. H04N 5/91
(52) U.S. Cl. .......................................... 386/67; 386/74
(58) Field of Search ............................. 386/46, 67, 68, 386/74, 109, 112, 124; 360/64, 77.13, 32, 261

(56) References Cited

U.S. PATENT DOCUMENTS

| | | | |
|---|---|---|---|
| 4,905,104 A | | 2/1990 | Okamoto et al. |
| 4,907,104 A | * | 3/1990 | Haikawa ...................... 360/64 |
| 4,942,487 A | * | 7/1990 | Noguchi et al. .......... 360/77.13 |
| 5,311,375 A | * | 5/1994 | Ikushima et al. .............. 360/64 |
| 5,335,116 A | * | 8/1994 | Onishi et al. .................. 386/67 |
| 6,115,531 A | * | 9/2000 | Yanagihara ................... 386/67 |

FOREIGN PATENT DOCUMENTS

| EP | 0 318 937 | 6/1989 |
|---|---|---|
| EP | 0 845 775 | 6/1998 |

* cited by examiner

Primary Examiner—Huy Nguyen
(74) Attorney, Agent, or Firm—Frommer Lawrence & Haug LLP; William S. Frommer; Dennis M. Smid

(57) ABSTRACT

A digital video cassette recorder comprising a plurality of heads provided on a rotary member and performing the recording/playback of the data on slanted tracks in performing helical scanning for a magnetic recording medium with the above mentioned heads, wherein the heads being composed of a first and a second heads being disposed opposing to each other at an angle of 180° and a third head being disposed in a position at an angle of 270° in the direction of rotation from the first head, having the same azimuth angle as that of the second head, the digital video cassette recorder also comprising a changeover switch for switching the first, the second and the third heads, and two modes having different data compression rates from each other, and in the first mode, recording/playback being performed in switching the first and the second heads alternately, and in the second mode, the tape feeding speed is made half and recording/playback being performed once in two rotations in switching the first and the third heads alternately. The fixing heights of heads on the rotary member are made to differ in every head, in order to dissolve the difference in head outputs caused by the difference in azimuth angles related with the direction of orientation of the magnetic recording medium and the recording direction of the slanted tracks and to dissolve the difference in head outputs caused by the imbalance of the side erase at the time of recording.

5 Claims, 5 Drawing Sheets

DIGITAL VIDEO CASSETTE RECORDER

BACKGROUND OF THE INVENTION

The present invention relates to a video cassette recorder, in particular, it relates to a video cassette recorder having SP/LP modes and SD/SDL modes.

In recent years, digital video cassette recorders for public use are spreading. Digital video cassette recorders for public use have better picture quality and are able to record longer programs in comparison with conventional analog system VTR. It is desired that a digital video cassette recorder can be operated in the same way as a conventional analog video cassette recorder is operated, and in particular it is needed that in the cases of a normal mode (SD mode) and a long play mode having a ½ tape speed of the normal tape speed, a digital video cassette recorder can be operated in the same way as an analog video cassette is operated. And also, it is desirable that the SP mode and the LP mode which have different track pitches can be used in the same way.

Accordingly, there are four independent modes in the format of a digital video cassette recorder for public use which are brought about from respective combinations of SP/LP modes having different track pitches and SD/SDL modes having different compression rates.

Among these, the track pitch in the SP mode is 10 μm. In the LP mode where the tape speed is 0.667 time of that in SP mode, the track pitch becomes 6.67 μm.

In the case of SDL mode, the recording information quantity per unit time is made half because of high compression rate and the tape speed is also made half of the tape speed in SD mode due to an intermittent recording which is performed once in two rotations.

Head constitutions for realizing SDL are described in the following:

1. There is a constitution in which a double gap head is used. However, in this method, it is technically difficult to make uniform the contact between the heads and the tape.

2. There is another constitution in which two pieces of +azimuth heads for SDL are separately used for the SD mode and for the LP mode. However, the constitution becomes four heads constitution including the +azimuth heads for SD mode, which makes it difficult to make the contact between respective heads and a tape uniform. With the increase in the number of heads, the head beating sound becomes larger, and the number of rotary transformer is also increased, which makes the structure of a drum complicated. The time for adjustment work is also increased with the increase in the number of heads because it is needed to adjust playback equalization characteristics about every head.

There is a problem that even in the case of the same track width, the output on the −azimuth side becomes smaller than that on the +azimuth side by about 1 dB caused by the relations ±azimuth angles between the tape orientation and the REC angle. Further, there is another problem that the side erase due to the exudation of magnetic field of a head upon recording gives more influence to the −azimuth side than to the +azimuth side and the effective residual width on the −azimuth side becomes narrower than that on the +azimuth side by about 1 μm.

In particular, since the LP mode is a narrow-track-pitch-mode, error rate margin till the critical error rate, that is, the time interval till the time when the output of the head goes into concealment is very small. Therefore, the output on the −azimuth side is decreased and the possibility of breaking the critical error rate becomes high with a small degradation of output.

As mentioned in the above, in a conventional digital video cassette recorder for public use, a plurality of heads are needed to realize a long play mode; thereby, there has been a problem that the constitution of a drum becomes complicated, that is, the cost of the recorder becomes high. There has been another problem that the difference in output levels among channels with azimuth angles is produced.

SUMMARY OF THE INVENTION

The object of the present invention is to realize a digital video cassette recorder in which a long play mode can be realized with a comparatively simple method, with a number of heads as small as possible, and also with no imbalance in the outputs among channels.

In order to achieve the above-mentioned objects, a digital video cassette recorder according to the present invention is constituted as described in the following: the digital video cassette recorder having a plurality of heads provided on a rotary member, and performing helical scanning for a magnetic recording medium with these heads, and performing recording/playback of data on slanted tracks in which two adjacent tracks have different azimuth angles from each other, wherein the heads being composed of a first head and a second head having different azimuth angles from each other being disposed opposing to each other on the rotary member at an angle of 180°, and a third head disposed at an angle of 270° from the first head in the rotation direction and having the same azimuth angle as that of the second head, and comprising a head changeover means for changing over the first, the second and the third heads, and the digital cassette recorder comprising two modes having different compression rate, wherein in a first mode, recording/playback being performed switching the first and the second heads alternately, in a second mode, the tape speed being lowered to a half and recording/playback being performed once in two rotations switching the first and the third heads alternately.

The digital video cassette recorder having a plurality of heads provided on a rotary member and performing recording/play-back of data on the slanted tracks in which two adjacent tracks having different azimuth angles in performing helical scanning for a magnetic recording medium with these heads, wherein fixed heights of heads are made to differ in every head, in order to dissolve the difference in the outputs caused by the difference in azimuth angles related with the direction of orientation of a magnetic recording medium and the recorded direction of the slanted tracks, and also to dissolve the difference in the out-puts caused by the imbalance of side erase.

DETAILED DESCRIPTION OF THE PREFERRED EMBODIMENT

Figure 1:
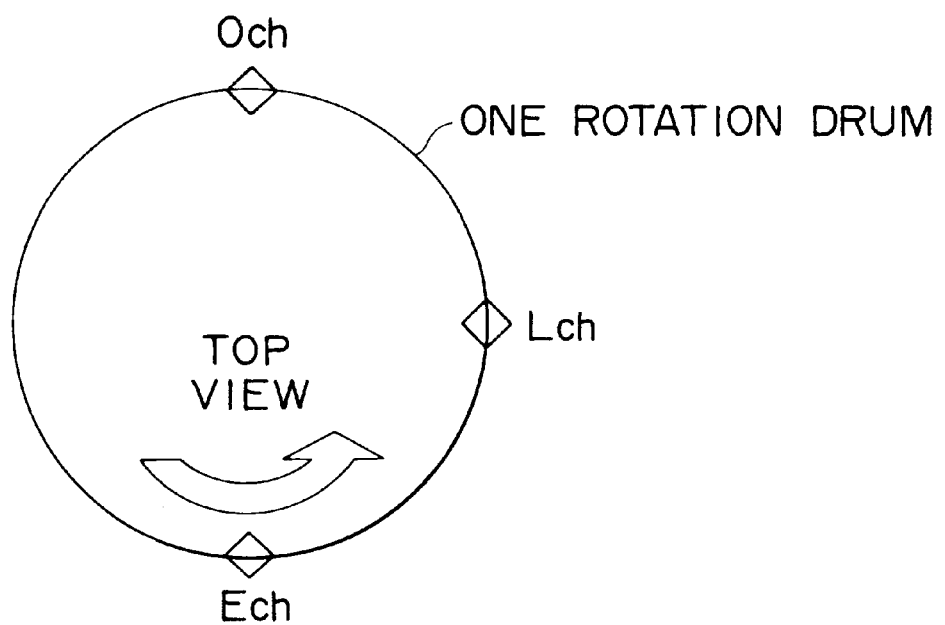
FIG. 1 shows head allocation on the drum of a digital video cassette recorder according to the present invention.

In the following, a digital video cassette recorder (DVCR) according to the present invention will be explained in detail referring to the drawings.

The idea of the present invention is as shown below.

1. The SD mode is realized by fixing two single gap heads of − and +azimuth angles on a drum opposing to each other at an angle of 180°, and the SDL mode is realized by fixing a −azimuth head and a +azimuth head being disposed at a position at an angel of 270° in the direction of rotation from the −azimuth head.

2. The height of the +azimuth head in the SDL mode is made to differ from the height of the −azimuth head in the SDL mode, a standard level, which makes the playback output in the LP mode of the −azimuth head and that of the +azimuth head be equal, in consideration of the difference in the tape outputs caused by the difference in the ±azimuth angles related to the direction of tape orientation and the REC angle, and also of the difference in out-puts caused by the imbalance of side erase at the time of recording.

3. The height of the +azimuth head is made higher than that of the −azimuth head in the SDL mode by +2.5 μm. In this case, the track width is 10 μm in both cases of azimuth and +azimuth in the pattern written in the SDL-SP mode, and in the case of SDL-LP mode, the track width on the −azimuth side is 7.5 μm and that on the +azimuth side is 5.83 μm. The side erase quantity in the case of −azimuth is 2 μm and that in the case of +azimuth is 1 μm, and it is canceled by the difference in the outputs 1 dB caused by − and +azimuth angles existing on the format, which makes the playback output uniform.

In the DVCR format for public use, the SD mode of the standard data compression rate and the SDL mode of high data compression rate are stipulated. Further in the track pitch, there are stipulations about SP mode in standard pitch and LP mode in narrow pitch. Therefore, there are four modes, SD-SP mode, SD-LP mode, SDL-SP mode and SDL-LP mode.

Assuming that the tape speed in the SD-SP mode is 1 time, that in the SD-LP mode is 0.67 time, that in the SDL-SP mode is 0.5 time and that in the SDL-LP mode is 0.33 time. The track pitch in the SP mode is 10 μm and that in the LP mode is 6.67 μm regardless of the SD or SDL.

SD mode can be realized in mounting two single gap heads on a drum of φ21.7 mm diameter and the rotations of 9,000 rpm being opposed to each other at an angle of 180°. In this case, the −azimuth head is denoted by Ech and the +azimuth head is denoted by Och.

In the case of the SDL mode, the tape feeding speed becomes 0.5 time of that in the SD mode, so that the recording is performed once in two rotations, that is, so called intermittent recording is performed. A method in which the Ech is commonly used and a +azimuth head in the SDL mode is mounted on the drum with difference in level in a position other than 180° is one of the methods to realize the SD mode and the SDL mode with one drum. The number of single gap head can be made minimum in the constitution as mentioned in the above.

FIG. 1, shows the head allocation of the drum. The +azimuth head in the SDL mode is fixed in a position at an angle of 270° in the direction of the drum rotation for Ech, and it will be denoted by Lch.

Figure 2:
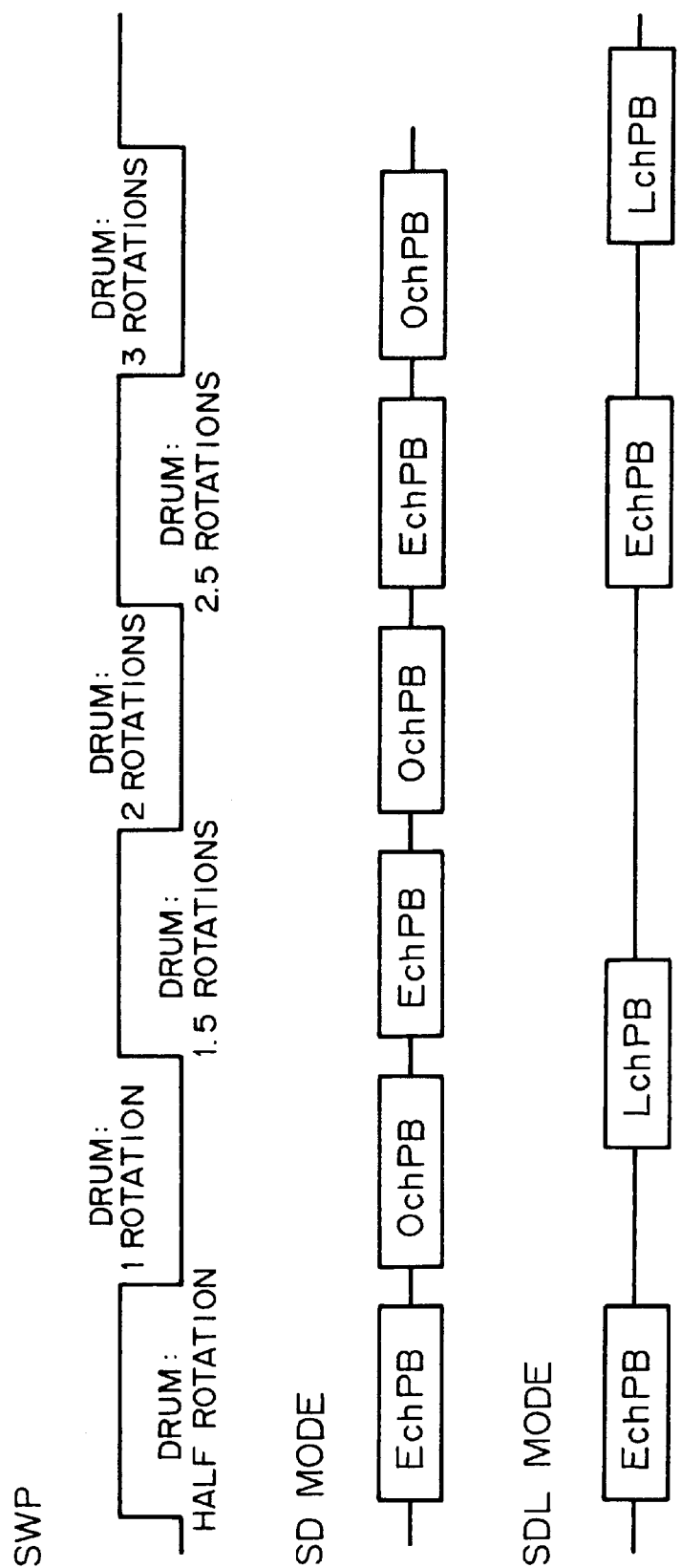
FIG. 2 shows the timing chart showing the relation between the rotation of the drum and the played back RF signal.

FIG. 2 shows the timing chart showing the relation between the rotation of the drum and the played back RF signal.

The tape is wound on the drum by 180°, and in the SD mode in a half rotation out of one rotation, Ech records on the tape and in the remaining half rotation Och records. In the SDL mode in a half rotation out of a first one rotation, Ech records on the tape, and after ¾ rotation, Lch starts to write in the second rotation, both Ech and Lch do not record, thus recording is performed once in two rotations, that is, so called intermittent recording is performed.

The recording angle stipulated in DVCR format for public use is 9.1688° and the azimuth angle is ±20°. The tape is oriented in the longitudinal direction, which means that the maximum output can be obtained when recording is performed in the longitudinal direction in the state where recording angle and the azimuth angle are both 0°. However, actually a cosine component of an angle formed by the direction of orientation and a recording head gap influences the tape output. Thereby, the difference in the output is produced naturally between the −azimuth head and the +azimuth head.

Figure 3:
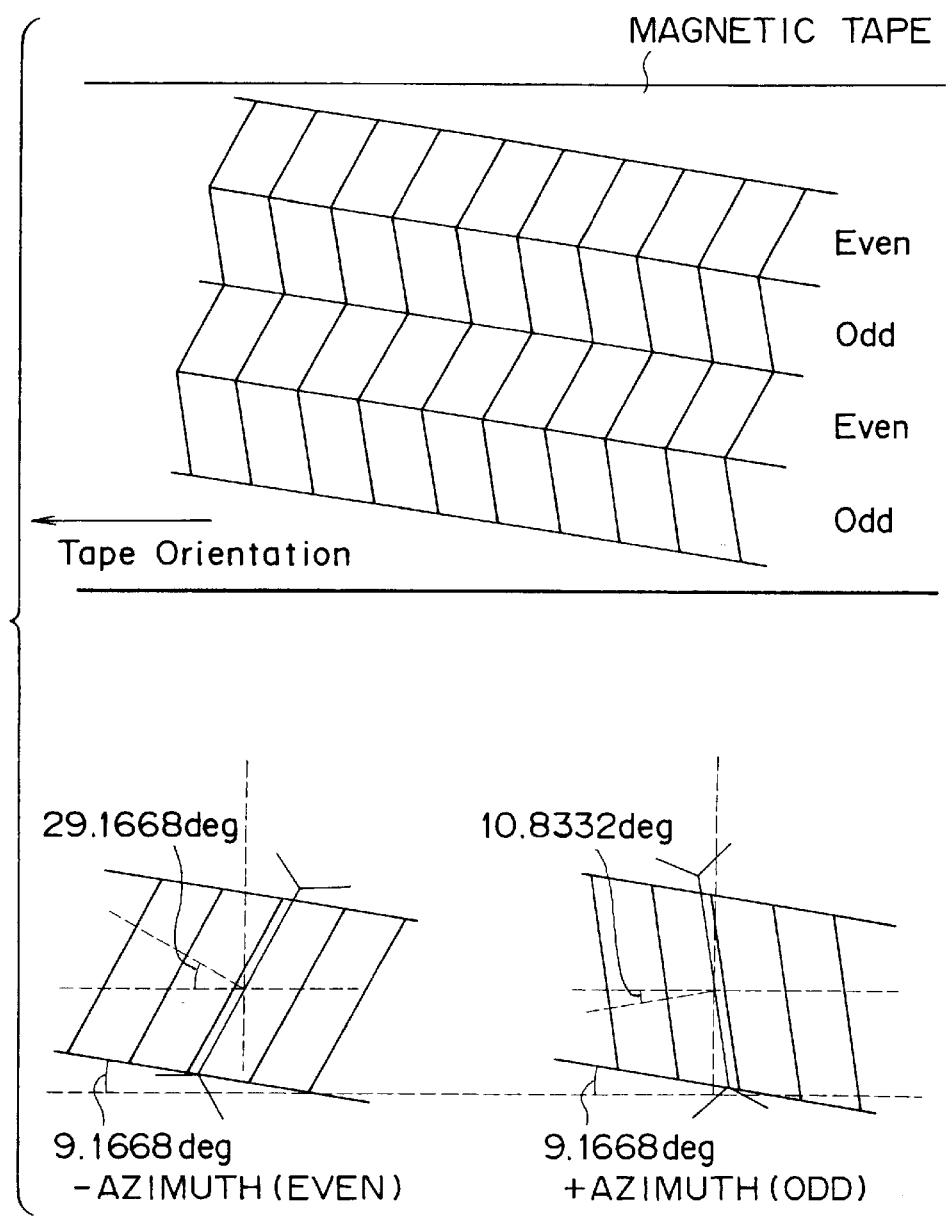
FIG. 3 shows the relation between the outputs of a −azimuth head and a +azimuth head.

FIG. 3 shows the difference in outputs between an −azimuth head and an +azimuth head. From the figure, the difference in outputs of the −azimuth head and the +azimuth head is calculated in the following equation:

$$20 \log \{\cos (9.1688-20)/\cos (9.1688+20)\}+1 \text{ dB}; \quad (1)$$

In short, even in a case where track width is the same, the output on the −azimuth head side becomes smaller by 1 dB.

Further, the difference in side erase at a recording time between a −azimuth head and a +azimuth head caused by the exudation of head magnetic field from the track side is also produced. It is also caused by the relation between the azimuth angle, and the direction of orientation and the recording angle, and the quantity of side erase when a pattern written by a −azimuth head is overwritten by a +azimuth head becomes larger than that when a pattern written by a +azimuth head is overwritten by a −azimuth head.

Figure 4:
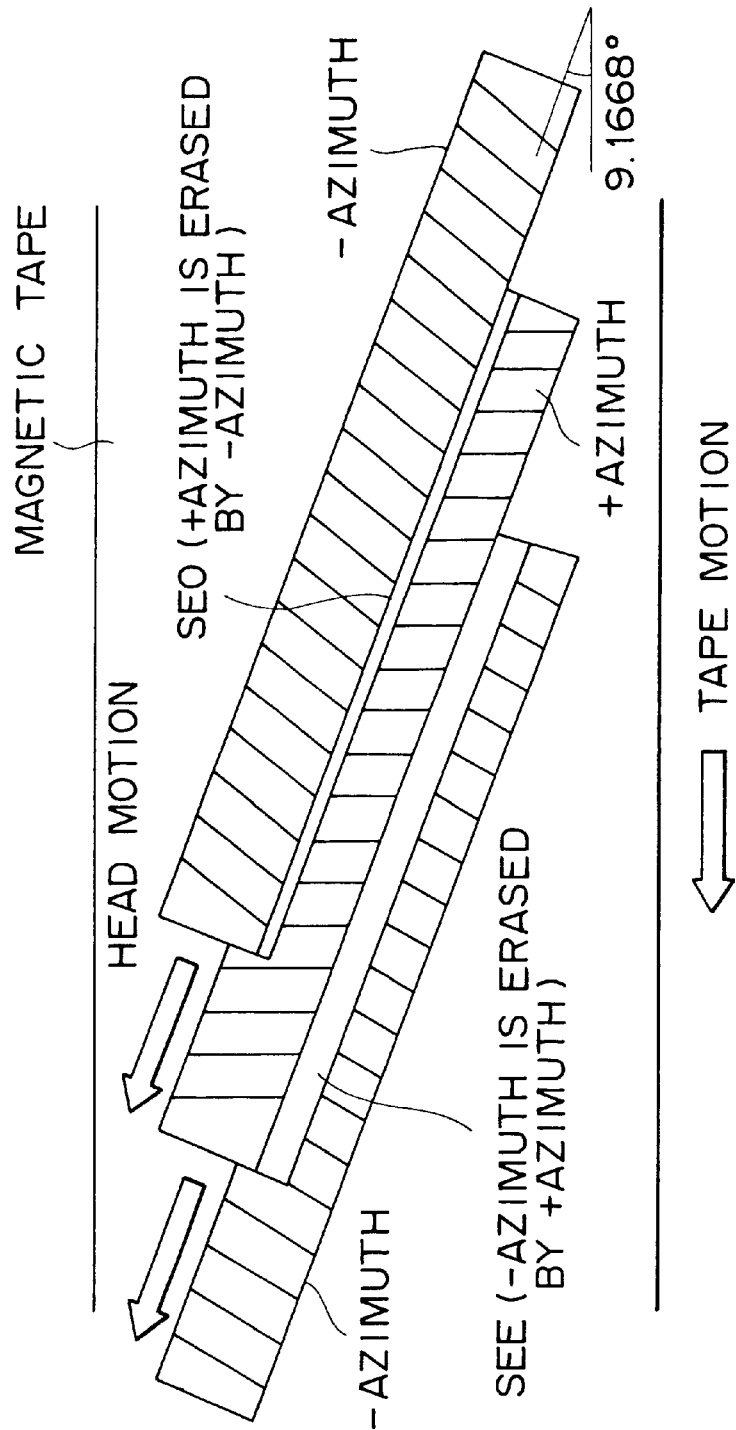
FIG. 4 shows the relation between an azimuth angle and the quantity of the side erase.

In FIG. 4, the relation between the azimuth angle and the quantity of side erase is shown. Let the side erase quantity in the case of a track on the −azimuth side be denoted by SEE and let the side erase quantity in the case of a track on the +azimuth side be denoted by SEO, then SEE and SEO are respectively 2 μm and 1 μm regardless of the mode or the track pitch. The track width on the −azimuth side becomes smaller than that on the +azimuth side by 1 μm, which makes the output of the −azimuth head decrease corresponding to the difference in the track widths as shown in the above.

In the LP mode, since the track width is as narrow as 6.67 μm, the playback output is small, so that the probability of passing the so called critical error rate in which data are concealed, caused by a little degradation in output is much higher than the case of the SP mode.

Further, the quantity of degradation in the output on the −azimuth side is large due to the reason mentioned in the above, so that the probability of passing the critical error rate is made higher. In order to avoid the above-mentioned phenomenon, the outputs of both azimuth heads are made equal by giving difference in heights of heads between a −azimuth head and a +azimuth head in anticipating the quantity of degradation in advance. The output of the −azimuth head can be upgraded as mentioned in the above.

Figure 5:
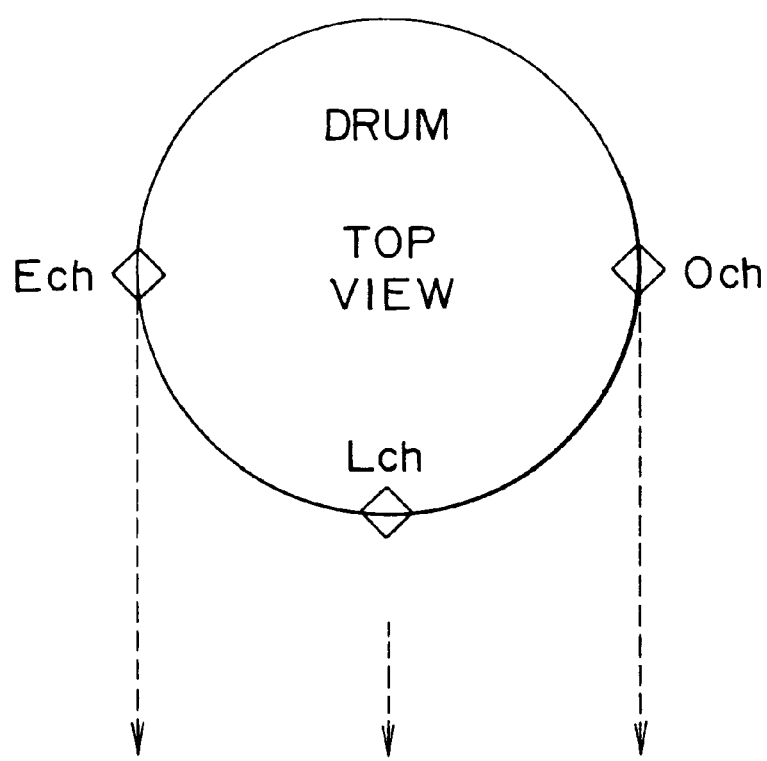
FIG. 5 shows relative fixing heights of respective heads in the present invention.
Figure 5:
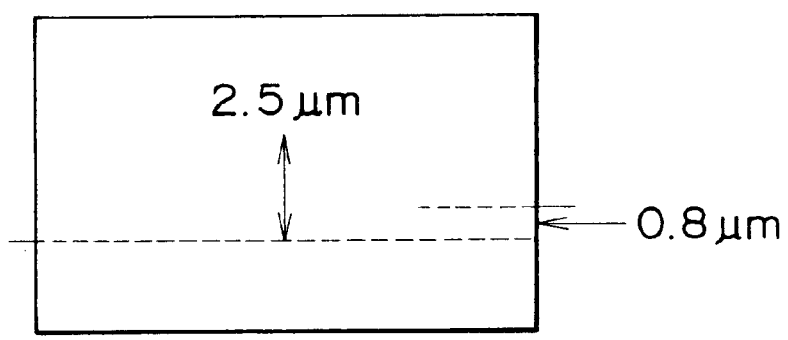

The relative fixing heights of respective heads taking into consideration of the above-mentioned points are shown in FIG. 5.

Let Ech be a standard level, Och is fixed at a level of +0.8 μm and Lch is fixed at a level of +2.5 μm. In the SD mode, alike in the SP and LP modes, twice the difference in the head heights, as it is, becomes the difference in the track width. Therefore, disregarding the quantity of side erase, the track width in the mode, SD-SP, on the −azimuth side is 10.8 $\mu$m and on the +azimuth side is 9.2 $\mu$m, and in the SDL mode, when the difference in the height of heads between the Ech and the Lch is expressed with X;

the track width on the −azimuth side in SDL-SP is:

$$(7.5+X)\mu m,$$

the track width on the +azimuth side in SDL-SP is:

$$20.0\ \mu m-(7.5+X)\ \mu m=(12.5-X)\mu m; \qquad (2)$$

the track width on the −azimuth side in SDL-LP is:

$$(5.0+X)\ \mu m,$$

the track width on the +azimuth side in SDL-LP is:

$$20.0 \times \tfrac{2}{3}\ \mu m-(5.0+X)\mu m=(8.33-X)\mu m; \qquad (3)$$

Therefore, in SDL-SP mode, the track widths both on −azimuth side and +azimuth side are 10 $\mu$m, and that in SDL-LP mode on the −azimuth side is 7.5 $\mu$m and that on the +azimuth side is 5.83 $\mu$m.

When the quantity of side erase is added and the actually remaining track width on the −azimuth side is:

$$7.5-2=5.5\ \mu m,$$

and that on the +azimuth side is:

$$5.83-1=4.83\ \mu m.$$

Therefore, the difference in outputs between both heads is, considering the value in equation (1):

$$20\ \log(5.5/4.83)-1=0.1\ dB.$$

Thus, the difference in outputs between ±azimuth heads can be neglected.

As explained in the above, following effects can be expected in constituting the system with 3ch constitution of single gap heads to realize the SD and SDL modes with a single drum.

1) The adjustment work to make the contacts between heads and a tape uniform is easy.

2) The structure of the drum and the rotary transformer can be made simple, which makes the manufacturing work easy.

3) The adjustment time in the manufacturing work can be relatively shortened.

4) The head beating sound is low owing to the small number of heads.

5) Further, in giving each different fixing height to every head, the difference in outputs between ±azimuth heads is canceled and the margin till the critical error rate, that is, the error rate margin can be increased.

The effects of the present invention will be described more in detail.

A digital video cassette recorder, according to the first aspect of the present invention, having a plurality of heads provided on a rotary member and performing recording/playback of data on the slanted tracks, in which two adjacent tracks having different azimuth angles, in performing helical scanning for a magnetic recording medium with these heads and having two modes of different compression rates, wherein the head assembly being composed of a first head and a second head being disposed opposing to each other at an angle of 180° and having different azimuth angles from each other and a third head disposed in a position at an angle of 270° from the first head in the rotation direction and having the same azimuth angle as that of the second head, and comprising a changeover means for switching the first, the second and the third heads, and in a first mode, one of the above mentioned two modes having different compression rates, recording/playback being performed in switching the first head and the second head alternately and in a second mode, another one of the above-mentioned two modes, the tape feeding speed being lowered to a half and recording/playback being performed once in two rotations in switching the first and the third heads alternately.

Thereby, a digital cassette recorder having the effects as described below can be realized: a long play mode can be realized with a small number of heads and the adjustment of the contact between the tape and a head is made easy, the structure of the drum and the rotary transformers is simplified which lowers the manufacturing cost, the time spent for the adjustment work in the manufacture is shortened, and the head beating sound of a tape is lowered.

The digital video cassette recorder, according to the second aspect of the present invention, having a plurality of heads provided on the rotary member and performing recording/playback of data on the slanted tracks, in which two adjacent tracks having different azimuth angles from each other, in performing helical scanning for a magnetic recording medium with these heads, wherein head fixing heights are made to differ in every head in order to dissolve the difference in outputs caused by the difference in the azimuth angles related with the direction of orientation of the magnetic recording medium and the direction of recording of the slanted tracks, and to dissolve the difference in outputs caused by the imbalance of side erase at the time of recording.

The digital video cassette recorder, according to the third aspect of the present invention, wherein the fixing height of the third head on the rotary member is made to differ from that of the first head in order to dissolve the difference in outputs caused by the difference in azimuth angles related with the direction of orientation of the magnetic recording medium and the direction of recording of the slanted tracks, and to dissolve the difference in outputs caused by the imbalance of the side erase at the time of recording.

The digital video cassette recorder, according to the forth aspect of the present invention, wherein the fixing height of the third head on the rotary member is made higher than that of the first head by +2.5 $\mu$m.

With this configuration, the digital cassette recorder can be realized with no difference in outputs between +azimuth heads, with no imbalance in the outputs among channels and with the increased error rate margin.

What is claimed is:

1. A digital video cassette recorder having a plurality of heads provided on a rotary member, performing recording/play-back of data on slanted tracks in which two adjacent tracks having different azimuth angles from each other in performing helical scanning for a magnetic recording medium with said heads, wherein said heads being composed of a first head and a second head provided on said rotary member being disposed opposing to each other at an angle of 180°, and a third head provided on said rotary member being disposed at an angle of 270° from said first head in a rotation direction of said rotary member and having the same azimuth angle as that of said second head, and comprising a head changeover means for changing over said first, second and third heads, said digital video cassette recorder comprising two modes being different in compression rates, wherein in a first mode, recording/playback being performed in switching said first head and said second head alternately and in a second mode recording/playback being performed once in two rotations of said rotary member in lowering the tape feeding speed to a half, in switching said first head and said third head alternately.

2. A digital video cassette recorder having a plurality of heads provided on a rotary member and performing recording/playback of data on slanted tracks in which two adjacent tracks having different azimuth angles from each other in performing helical scanning for a magnetic recording medium with said heads, wherein the fixing heights of said heads on said rotary member are made to differ from each other in order to dissolve the difference in outputs caused by the difference in azimuth angles related with the direction of orientation of said magnetic recording medium and the direction of recording of said slanted tracks, and to dissolve the difference in outputs caused by the imbalance of a side of said track at the time of recording, and wherein said heads being composed of a first head and a second head provided on said rotary member being disposed opposing to each other at an angle of 180°, and a third head provided on said rotary member being disposed at an angle of 270° from said first head in a rotation direction of said rotary member.

3. A digital video cassette recorder as designated in claim 1, wherein said third head being fixed at a different height from that of said first head on said rotary member, in order to dissolve the difference in outputs caused by the difference in azimuth angles related with the direction of orientation of said magnetic recording medium and the direction of recording of said slanted tracks, and to dissolve the difference in outputs caused by the imbalance of a side of said track at the time of recording.

4. A digital video cassette recorder as designated in claim 2, wherein the fixing height of said third head on said rotary member is made higher than that of said first head by +2.5 $\mu$m.

5. The digital video cassette recorder of claim 3, wherein the fixing height of said third head on said rotary member is made higher than that of said first head by +2.5 $\mu$m.

* * * * *